United States Patent [19]

Raskin

[11] Patent Number: 4,477,426
[45] Date of Patent: Oct. 16, 1984

[54] PROCESS FOR PREPARING A SULFUR DIOXIDE CONTAINING GAS STREAM FOR REACTION WITH COAL

[75] Inventor: Neil R. Raskin, Livingston, N.J.

[73] Assignee: Foster Wheeler Energy Corporation, Livingston, N.J.

[21] Appl. No.: 490,078

[22] Filed: Apr. 29, 1983

[51] Int. Cl.³ .......................... C01B 17/04; B01J 8/00
[52] U.S. Cl. .................. 423/569; 423/244 R; 423/539
[58] Field of Search .................. 423/539 R, 522, 533, 423/569, 570, 244 R; 422/160, 161

[56] References Cited

U.S. PATENT DOCUMENTS

| | | | |
|---|---|---|---|
| 1,972,883 | 9/1934 | Cleason et al. | 423/569 |
| 2,148,258 | 2/1939 | Carter | 423/569 |
| 2,629,651 | 2/1953 | Merrian et al. | 423/533 |
| 3,764,665 | 10/1973 | Groenendaac et al. | 423/539 |
| 4,147,762 | 4/1979 | Steiner | 423/569 |
| 4,194,889 | 3/1980 | Wanner | 55/73 |
| 4,212,855 | 7/1980 | Kerwer et al. | 423/522 |
| 4,219,537 | 8/1980 | Steiner | 423/569 |
| 4,328,201 | 5/1982 | Steiner | 423/659 |
| 4,333,917 | 6/1982 | Dorr et al. | 422/161 |

FOREIGN PATENT DOCUMENTS

| | | | |
|---|---|---|---|
| 56-124428 | 9/1981 | Japan | 423/569 |
| 144306 | 9/1921 | United Kingdom | 423/569 |

*Primary Examiner*—Gary P. Straub
*Attorney, Agent, or Firm*—Marvin A. Naigur; John E. Wilson; Warren B. Kice

[57] ABSTRACT

A process for preparing a gas stream containing sulfur dioxide and water for reaction with coal to convert the sulfur dioxide to gaseous elemental sulfur. Water is initially removed from the gas stream to increase the percentage of sulfur dioxide in the stream after which the gas stream is passed through the flame of a burner to add combustion gases to the gas stream. Steam is then mixed with the gas stream to increase the percentage of water in the gas stream before it is reacted with the coal.

7 Claims, 2 Drawing Figures

PROCESS FOR PREPARING A SULFUR DIOXIDE CONTAINING GAS STREAM FOR REACTION WITH COAL

BACKGROUND OF THE INVENTION

This invention relates generally to pollution control systems and, more particularly, to a pollution control system for the removal of sulfur oxides from flue gases and the reduction of the sulfur oxides to sulfur.

It is known in the field of atmospheric pollution control to use an adsorptive process for the desulfurization of flue gases in which the sulfur-containing material is adsorbed in the porous system of an activated carbonaceous material. For example, in U.S. Pat. No. 4,219,537 adsorption is carried out in a gas-solid contacting device in which the flue gases are contacted with activated char. Sulfur dioxide in a diluted form in the gas stream passing through the activated char is adsorbed and oxidized to sulfuric acid by the oxygen and water vapor present in the gas stream.

The acid-laden or saturated char is then thermally regenerated in a regenerator, desorption vessel, or the like, by a process in which the sulfur-containing material is chemically changed in form, resulting in the decomposition of sulfuric acid to sulfur dioxide and water, whereby a portion of the carbonaceous adsorbent is oxidized to carbon dioxide. The by-product of the regeneration process is a gas stream containing 20-30% a concentrated amount of sulfur dioxide.

The $SO_2$-rich off-gas is usually treated further to produce elemental sulfur, which is storable and which has certain commercial applications. As taught in U.S. Pat. No. 4,147,762 the off-gas is introduced into a reactor and is reacted with crushed coal to yield gaseous elemental sulfur, which is then passed to a condenser and condensed into liquid sulfur. The liquid sulfur may be stored in appropriate containers, or may be cooled to a solid form.

In the above-described process, $SO_2$-rich off-gas from the regenerator contains approximately 20-30% of $SO_2$ by volume which requires a relatively high volume of gas to be handled when compared to the amount of sulfur recovered. This relatively high volume of off-gas requires correspondingly large sized equipment, including fans, piping, valves, etc., which is expensive.

SUMMARY OF THE INVENTION

It is therefore an object of the present invention to provide a method of preparing a $SO_2$-rich gas stream for reaction with coal, in which the volume of the off-gas from the regenerator is considerably reduced before the gas is passed to a reactor, which causes an attendant reduction in the size of associated equipment required to handle the gases, resulting in a considerable cost reduction.

It is also an object of the present invention to provide a method of the above type in which the volume of off-gas is reduced by removing water from the off-gas.

It is a further object of the present invention to provide a method of the above type in which combustion gas from a burner is added to the off-gas after the water has been removed.

It is a still further object of the present invention to provide a method of the above type in which steam is added to the off-gas immediately prior to introducing the latter into the reactor.

Toward the fulfillment of these and other objects, the method of the present invention relates to a process for preparing a gas stream containing essentially sulfur dioxide and water for reaction with coal to convert the sulfur dioxide to gaseous elemental sulfur. Water is initially removed from the gas stream to increase the percentage of sulfur dioxide in said stream, after which the stream is passed through the flame of a burner to add the combustion gas from the burner to the stream. Steam is then mixed with the gas stream to aid the temperature of the gas and to increase the percentage of water in said gas stream to an amount consistent with an optimum reaction with the coal.

BRIEF DESCRIPTION OF THE DRAWINGS

The above description, as well as further objects, features, and advantages of the present invention, will be more fully appreciated by reference to the following description of the presently-preferred embodiment illustrative of the present invention, when taken in connection with the accompanying drawings, wherein.

DESCRIPTION OF THE PREFERRED EMBODIMENT

Figure 1:
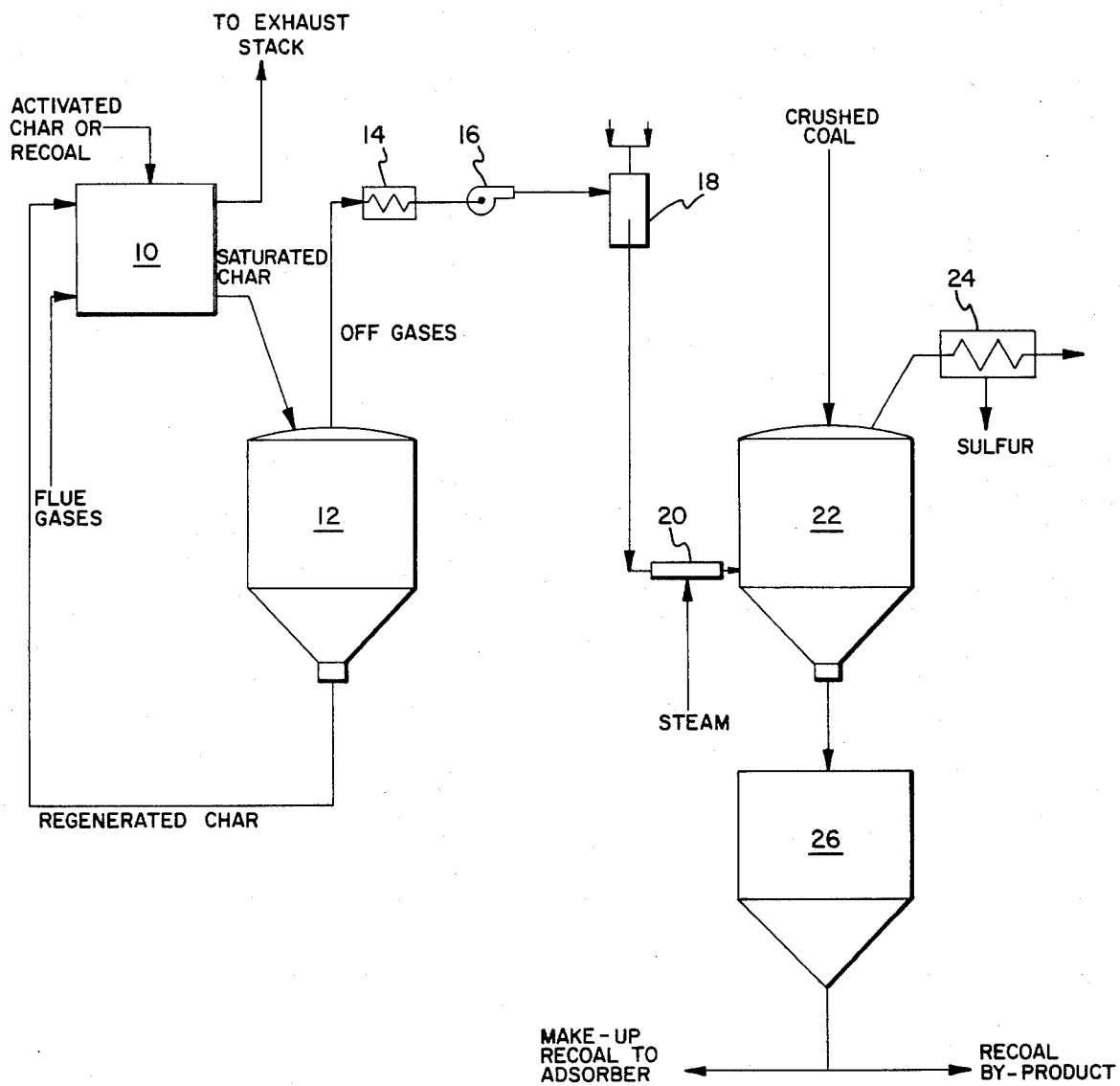
FIG. 1 is a schematic diagram showing the flow of materials in a pollution control system incorporating the novel method of the present invention.

Referring to the pollution control system depicted in the drawing, the reference numeral 10 refers in general to an adsorber which receives flue gases from a vapor generator after they have passed through a particulate matter separator, or the like (not shown). In the adsorber 10 the flue gases are contacted with adsorbent material, usually in the form of a preoxidized bituminous coal, or activated char.

The sulfur dioxide in the flue gases is adsorbed by the activated char and oxidized to sulfuric acid by the oxygen and water vapor present in the gas stream. Other acid gases, such as nitrogen oxides, are similarly adsorbed, and particulate matter entrained in the gas stream is filtered by passage of the stream through the activated char.

The acid-laden, or saturated, char is then passed to a regenerator 12 to which an inert heat exchange medium, such as sand, at a predetermined, elevated temperature is supplied. The heated sand and the saturated char pellets pass through the regenerator in intimate contact which raises the temperature of the mixture to a predetermined level to cause the sulfuric acid in the porous system of the activated char to be converted first to sulfuric acid anhydrate ($SO_3$) and then to $SO_2$, and the nitrogen compounds to $N_2$. A highly-concentrated, $SO_2$-rich off-gas stream is produced, containing 20-30% $SO_2$ by volume. The sand/char mixture leaving the regenerator goes through a separator (not shown) which separates the regenerated char from the sand, with the separated char being cooled and recycled to the adsorber 10 for re-use.

The $SO_2$-rich off-gas stream from the regenerator 12 is drawn through a condenser 14 by a fan 16 before it is injected into an in-line burner 18 which will be described in detail later.

The gas stream then passes downstream of the burner 18 to a mixing chamber 20 into which steam is injected before it passes into a RESOX$^R$ reactor 22. In the RESOX$^R$ reactor 22, the stream is reacted with crushed coal to yield gaseous elemental sulfur which is then passed to a condenser 24 where it becomes liquified. The liquid sulfur may be stored in a liquid form or solidified by further cooling.

A more detailed description of the RESOX$^R$ process per se is provided in the above referenced U.S. Pat. No. 4,147,762, the teachings of which are incorporated herein by reference. This patent teaches the technique of feeding the sulfur-dioxide containing off-gas to a reaction zone containing coal and maintained at an elevated temperature sufficient to convert the sulfur dioxide to gaseous elemented sulfur and to partially oxidize the coal.

The spent coal from the RESOX$^R$ reactor 22 is passed to a storage bin 26 and is formed from raw crushed coal which is partially oxidized and imparted a surface porosity by the action of the $SO_2$, $O_2$, and steam in the reactor. The operating parameters can be controlled to produce a RECOAL$^{tm}$ product containing 50–60% by weight of the original coal, which can then be rerouted to the adsorber 10 or used as a by-product.

Figure 2:
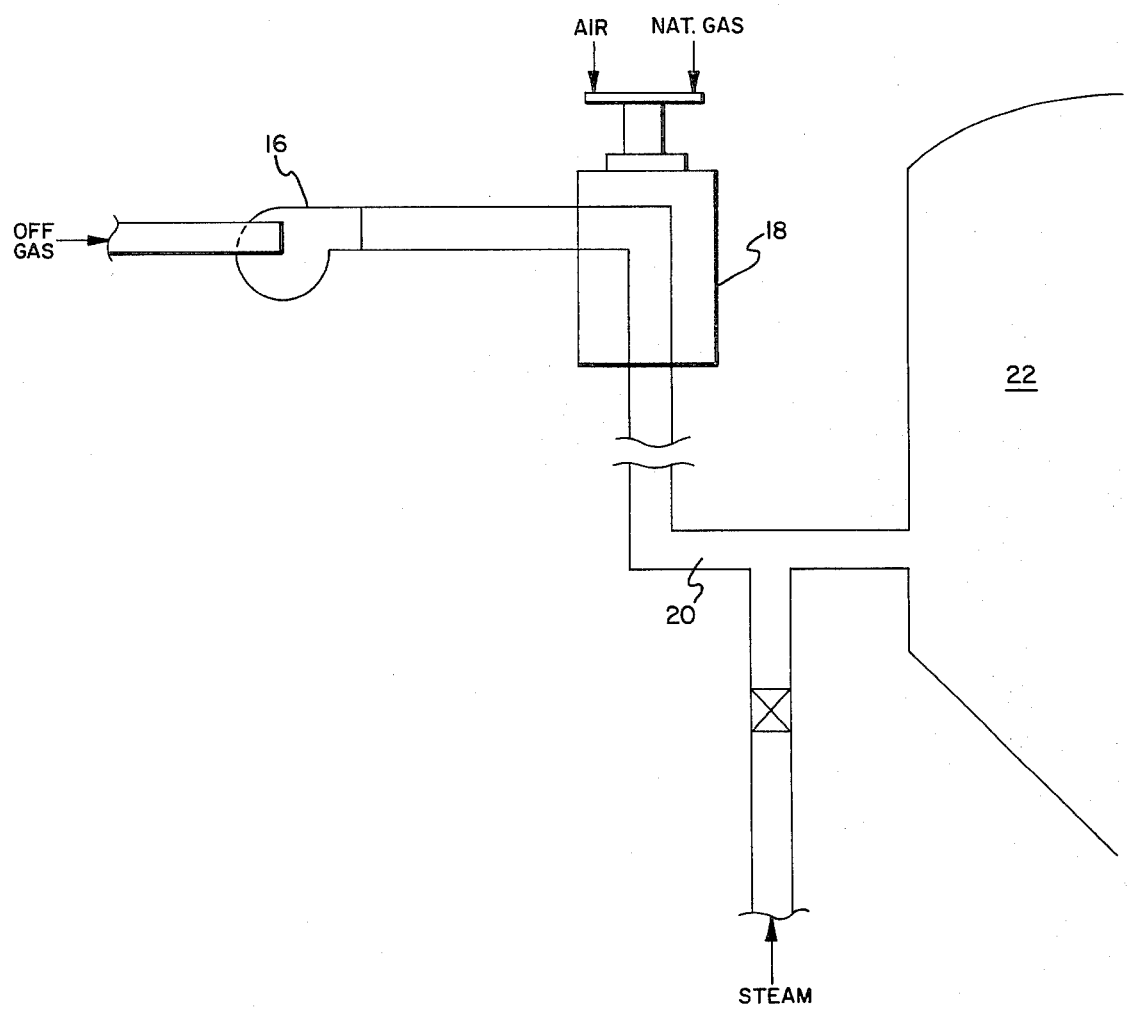
FIG. 2 is an enlarged view showing a portion of the components of the apparatus of FIG. 1.

As set forth above, the off-gas stream from the regenerator 12 contains approximately 20–30% of $SO_2$ by volume and the remainder water, which requires relatively large equipment downstream from the regenerator 12 including fans, piping, valves, vessels, etc., to process enough gas to render the system cost-efficient. According to the present invention, the off-gases are passed through the condenser 14, or any type of cooling mechanism, in which water is condensed out of the stream, thus increasing the $SO_2$ concentration in the gas to 70–90% by volume and reducing the volume of the gas stream by 50–60%. The stream, at a temperature of approximately 150° F., is then passed to the burner 18 by the fan 16. As shown in FIG. 2, the burner 18 receives a mixture of natural gas and air from external sources and operates to combust the former, with the resulting combustion gases mixing with the $SO_2$-rich gas from the condenser 14. This increases the temperature of the stream to 800° F. and increases the reduced volume of the gas stream entering the burner by 50%.

The gas stream then passes from the burner 18 to the mixing chamber 20 where sufficient amounts of 800°–1000° F. steam are injected into the gas stream for mixing therewith to obtain a molar ratio of $H_2O$ to $SO_2$ of 2.5 to 1 and to raise the temperature of the stream to approximately 875°–925° F., both of which are necessary for efficient reduction of the $SO_2$ to eliminate sulfur within the RESOX$^R$ reactor. The resulting mixture is then injected into the RESOX$^R$ reactor 22 causing ignition of the anthracite reductant within the vessel to convert the $SO_2$ to elemental sulfur.

As a result, a much more efficient operation is achieved due to the relatively low volume of gas (with a high $SO_2$ concentration) entering the burner 18 since the sizing of the associated piping, valves, etc., can be reduced.

It is understood that the RESOX$^R$ reactor 22 and regenerator 12 are preferably moving bed vessels, but they may also provide means for fluidized bed or static bed operation. The terminology "nonstatic bed", as used herein is meant to cover both moving bed operation and fluidized bed operation. For a definition of what is meant by moving bed operation refer to column 5, line 36–41, of U.S. Pat. No. 2,883,333 issued Apr. 21, 1959 to R. C. Oliver. It is also understood that the heat source for the regenerator 12 can be other than the sand/char mixture discussed above. For example, a hot regenerating gas can be used to regenerate the activated carbons as shown in U.S. Pat. No. 1,933,454 or U.S. Pat. No. 3,667,910, the teachings of which are incorporated herein by reference.

Several other variations can also be made in the foregoing method without departing from the scope of the invention. For example, the condenser 14 may be replaced by any type of cooling system, including one associated with the regenerator 12, to remove the water from the gas stream and thus increase the percentage by volume of $SO_2$ in the off-gases from the regenerator. It is also understood that the regenerator can be provided with a regenerating gas loop as disclosed in the above-referenced U.S. Pat. No. 4,219,537, the teachings of which are incorporated herein by reference.

Other latitudes of modification, change and substitution are intended in the foregoing disclosure and in some instances some features of the invention will be employed without a corresponding use of other features. Accordingly, it is appropriate that the appended claims be construed broadly and in a manner consistent with the spirit and scope of the invention therein.

What is claimed is:

1. In a gas desulfurization process comprising the steps of
   (1) contacting flue gases containing sulfur oxides with activated char so that the sulfur oxides are absorbed in the porous system of the char and oxidized to sulfuric acid by the oxygen and water vapor present in the gas stream;
   (2) regenerating the saturated char formed in step (1) in a regeneration zone to decompose the sulfuric acid to sulfur dixoide and water and form an off-gas containing 20%–30% by volume of sulfur dioxide and 70%–80% by volume of water;
   (3) feeding the off-gas formed in step (2) to a reaction zone containing coal and maintained at an elevated temperature sufficient to convert the sulfur dioxide in said off-gas to gaseous elemental sulfur and to partially oxidize the coal, said reaction zone being located a distance from said regeneration zone sufficient to require significantly large sized equipment to feed the off-gas from said regeneration zone to said reaction zone; the improvement which comprises;
   (4) removing water from said off-gas formed in step (2) before it is transported and fed to said reaction zone to reduce the volume of said off-gas by at least 50% and to increase the sulfur dioxide concentration in said off-gas to 70–90% by volume;
   (5) transporting the off-gas from step (4);
   (6) treating the transported off-gas by:
      (a) passing said off-gas through the flame of a burner to raise the temperature of said off-gas to a value sufficient to permit the conversion of step (3) while increasing the volume of said off-gas by adding to said off-gas the combustion gas and water resulting from combustion at said burner, and by raising its temperature, the increased water being insufficient to permit said conversion, and
      (b) mixing steam with the off-gas from step (5) to increase the water content of said off-gas to a value sufficient to permit the conversion of step (3) while maintaining the temperature of said off-gas at a value sufficient to permit said conversion; and
   (7) feeding said treated off-gas to said reaction zone.

2. The improvement of claim 1 whereby steps (5) and (6) increase the volume of said off-gas by approximately 50%.

3. The improvement of claim 1 wherein said step of mixing increases the molar ratio of water to sulfur dioxide in said off-gas to 2.5 to 1.0.

4. The improvement of claim 1 wherein said off-gas is initially at a temperature of at least 800°–1000° F.

5. The improvement of claim 4 wherein said step of removing reduces the temperature of said off-gas to approximately 150° F.

6. The improvement of claim 5 wherein said step of passing increases the temperature of said off-gas stream to approximately 800° F.

7. The improvement of claim 6 wherein said step of mixing increases the temperature of said off-gas to approximately 875°–925° F.

* * * * *